United States Patent [19]

O'Brien et al.

[11] Patent Number: 5,170,283

[45] Date of Patent: Dec. 8, 1992

[54] SILICON SPATIAL LIGHT MODULATOR

[75] Inventors: Benedict B. O'Brien, Manhattan Beach; Brent E. Burns, Torrance; King L. Hu, Lawndale; Adrian C. Ionescu, West Covina, all of Calif.

[73] Assignee: Northrop Corporation, Hawthorne, Calif.

[21] Appl. No.: 735,392

[22] Filed: Jul. 24, 1991

[51] Int. Cl.$^5$ .................. G02B 26/00; G02B 26/08; H04N 5/74; H04N 3/08

[52] U.S. Cl. .................. 359/291; 359/212; 359/224; 358/233; 358/206

[58] Field of Search .............. 359/230, 212, 224, 317, 359/318, 291–292, 295, 279; 358/233, 206, 234; 346/160

[56] References Cited

U.S. PATENT DOCUMENTS

| | | | |
|---|---|---|---|
| 3,001,447 | 9/1961 | Ploke | 359/292 |
| 3,463,572 | 8/1969 | Preston, Jr. | 359/295 |
| 3,746,785 | 7/1973 | Goodrich | 359/291 |
| 3,796,480 | 3/1974 | Preston, Jr. et al. | 359/295 |
| 4,087,810 | 5/1978 | Hung et al. | 359/291 |
| 4,229,732 | 10/1980 | Hartstein et al. | 358/233 |
| 4,248,504 | 2/1981 | Albertinetti et al. | 359/295 |
| 4,441,791 | 4/1986 | Hornbeck . | |
| 4,566,935 | 1/1986 | Hornbeck | 359/291 |
| 4,571,603 | 2/1986 | Hornbeck et al. . | |
| 4,615,595 | 10/1986 | Hornbeck . | |
| 4,662,746 | 5/1987 | Hornbeck . | |
| 4,710,732 | 12/1987 | Hornbeck . | |
| 4,954,789 | 9/1990 | Sampsell | 359/318 |
| 4,956,619 | 9/1990 | Hornbeck . | |
| 5,061,049 | 10/1991 | Hornbeck | 359/298 |

FOREIGN PATENT DOCUMENTS 0332953 3/1989 European Pat. Off. .

OTHER PUBLICATIONS

Dennis R. Paper and Larry J. Hornbeck, "Characteristics of the deformable mirror device for optical information processing", Opt. Eng., Nov.–Dec., 1983, vol. 22, No. 6, pp. 675–681.

Primary Examiner—Eugene R. LaRoche
Assistant Examiner—Evelyn A. Lester
Attorney, Agent, or Firm—Terry J. Anderson; Robert B. Block

[57] ABSTRACT

A spatial light modulator including a silicon backplate having an insulating layer and a standoff grid of insulating material deposited on the backplate to define an array of cells. An electrode is deposited in each cell on said backplate. A thin membrane of doped silicon is mounted to the standoff grid and over said array of cells and electrodes. Mirrors are laid on the membrane to create an array of reflective pixels over the array of cells. When an electrode is selectively charged the portion of the membrane overlying that cell is deflected by electrostatic attraction between the membrane and the electrode. Taken overall, a pattern is assumed by the array of pixels which corresponds to the state of the electrical signals placed on the electrodes. A vent hole formed in each cell from the electrode side of the backplate to the opposite side thereof for venting gas from the cell when said diaphragm is deflected, and grooves extend across the face of the backplate and over the cell to intersect the vent hole to assist in venting gas out of the cell and through the hole. The vent hole is preferably of a size and constructed for critical damping of the movement of the mass of the deflected diaphragm at said cell to control the movement caused by the electrostatic deflection. Flexures of reduced cross-section are formed in the diaphragm along a closed line extending around the inside perimeter of the stand off grid, so that said diaphragm moves more nearly in piston mode within the flexure.

17 Claims, 3 Drawing Sheets

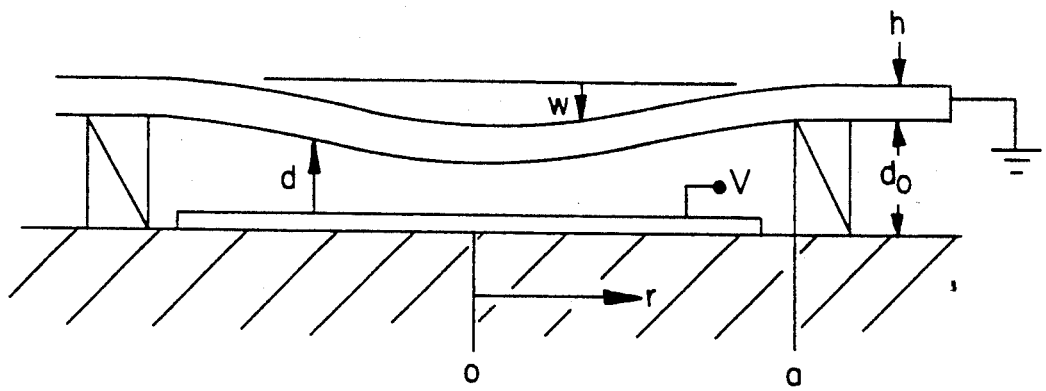
F I G. 4A
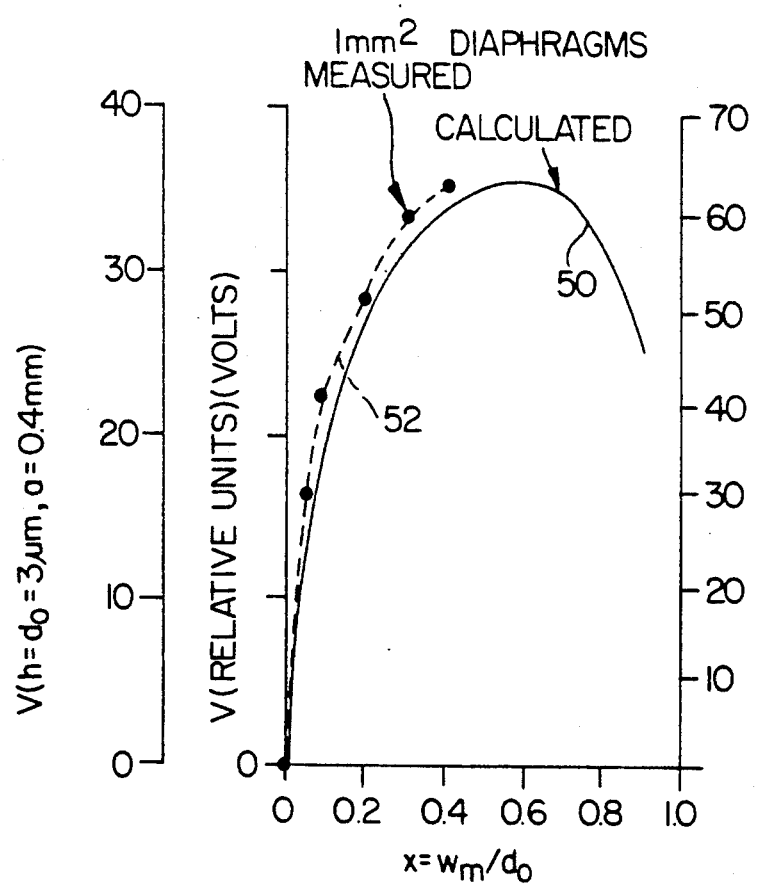
F I G. 4B

SILICON SPATIAL LIGHT MODULATOR

BACKGROUND OF THE INVENTION

Spatial light modulators are used as an active element in many optical processor applications, such as in correlators and optical neural networks.

The present invention relates to spatial light modulators (SLM) and more particularly to spatial light modulators using deformable mirror technology. More particularly, the present invention relates to an improved spatial light modulator having high diffraction efficiency, low spurious diffraction, excellent thermal stability, and a high power handling capacity.

PRIOR ART

In one form, spatial light modulators of the deformable mirror type have been made as an array of mirror elements or pixels formed on a membrane or petal structure supported on a grid in spaced relation to a corresponding array of electrodes deposited on a substrate and individually movable by the application of a local electric field as applied to each electrode to deflect the corresponding mirror element. When deflected into an appropriate pattern in accordance with the state of the applied electric signals, the collective deflection of the elements or pixels causes a phase change in the wave front of a light beam reflected from the array so that information carried in the electric signal state is encoded onto a light beam reflected by the array.

Prior art spatial light modulators of this general type are known from U.S. Pat. No. 4,441,791, issued Apr. 10, 1984 to Hornbeck for a Deformable Mirror Light Modulator; U.S. Pat. No. 4,571,603, issued Feb. 18, 1986 to Hornbeck et al for a Deformable Mirror Electrostatic Printer and from publication "Characteristics of the Deformable Mirror Device for Optical Information Processing", Opt. Eng. Nov.-Dec. 1983, vol. 22 No. 6, pg 675-681. In these references there is proposed a spatial light modulator using a polymer diaphragm supported on a grid over an array of electrodes mounted on a backplate. The references describe the theory of operation of such a device. Careful analysis of this type of device reveals that the diffraction efficiency is less than desirable and far less than an appreciable percentage of that available; the temperature sensitivity due to the use of dissimilar material is significant; and the deflection parameters are less than optimum. These limitations are principally due to the use of dissimilar materials; i.e., a polymer diaphragm material on a silicon backplate. The polymer has a very different thermal coefficient of expansion from silicon so that the tension that is developed in the diaphragm changes dramatically over a temperature range. Further, the cavity between the backplate and the diaphragm is pressure sensitive so that the transducer itself becomes pressure sensitive. The drum nature of the deflection of the diaphragm limits the diffraction efficiency. Thus, the devices of the type shown in this art are not readily adaptable for use over a wide temperature range or for modulation purposes involving high frequency operation. Additionally, the use of significant powers of incident radiation beam is also limited due to the thermal limits of the diaphragm, which, for most plastics, would be less than about 200° C.

A number of other prior art patents disclose spatial light modulators of different constructions with, however, similar deficiencies. Such other constructions are exemplified in the following patents: U.S. Pat. No. 4,956,619, issued Sep. 11, 1990 to Hornbeck for a Spatial Light Modulator; EP 0,332,953 A2, issued Mar. 3, 1989 to Hornbeck for a Spatial Light Modulator and Method; U.S. Pat. No. 4,662,746, issued May 5, 1987 to Hornbeck for a Spatial Light Modulator and Method; U.S. Pat. No. 4,615,595, issued Oct. 7, 1986 to Hornbeck for a Frame Addressed Spatial Light Modulator; and U.S. Pat. No. 4,710,732, issued Dec. 1, 1987 to Hornbeck for a Spatial Light Modulator and Method.

Where the structure utilizes a diaphragm formed as a petal or flap structure in which edges of each petal are hinged to a support on one side and otherwise completely free as in U.S. Pat. No. 4,615,595, a problem arises from spurious diffraction even in the absence of intentional deflection of the petals due to the tendency for each of the petals to curl from stresses induced by manufacturing process etching. Also, light modulators using petal constructions have an inherent tilt imparted to the beam which is undesirable.

There is, therefore, a need for an improved compact spatial light modulator which will overcome the limitations and disadvantages of the prior art and which is especially suited for phase modulation of high power laser beams.

SUMMARY OF THE INVENTION AND OBJECTS

In general, it is the object of the present invention to provide an improved spatial light modulator which will overcome the above limitations and disadvantages.

A further object of the invention is to provide a spatial light modulator of the above character which is thermally stable for operating over a wide range of temperatures.

A further object of the invention is to provide a spatial light modulator of the above character which is operable with very high incident power levels as high as 1000 watts.

A further object of the invention is to provide a spatial light modulator of the above character which provides significantly increased diffraction efficiency.

In accordance with the present invention there is provided a spatial light modulator including a silicon backplate having a thin insulating layer on which is deposited a second layer of insulating material forming a standoff grid to define an array of cells. The material on the grid has a similar coefficient of expansion to silicon. An electrode is deposited on said thin insulating layer on said backplate in each cell. A thin membrane of doped silicon is mounted to the standoff grid and over said array of cells and electrodes. A highly reflecting surface is deposited on the membrane on the side facing away from the backplate to create an array of reflective pixels over the array of cells, which when the respective electrode is selectively charged causes the individual portions of the membrane and pixel overlying each cell to be deflected by electrostatic attraction between the membrane and the electrode in accordance with a pattern corresponding to the state of the electrical signals placed on the electrodes. A vent hole is formed in each cell from the electrode side of the backplate to the opposite side thereof for venting gas from the cell when said diaphragm is deflected, and grooves extend across the face of the backplate and over the cell to intersect the vent hole to assist in venting gas out of the cell and through the hole. The vent hole is preferably of a size and constructed for critical damping of the movement of the mass of the deflected diaphragm at said cell to control the movement caused by the electrostatic deflection. Flexures of reduced cross-section are formed in the diaphragm along a closed line extending around the inside perimeter of the stand off grid, so that said diaphragm moves more nearly in piston mode within the flexure.

These and other features of the invention will become apparent from the following description of an improved spatial light modulator structure constructed of essentially a single silicon material throughout, in single crystal form, and to the various features thereof as herein disclosed in the accompanying detailed description and drawings, of which:

BRIEF DESCRIPTION OF THE DRAWINGS

FIG. 4A is a model of a cell without diaphragm flexures of the array of FIGS. 1 through 3 illustrating its operation in response to a deflection voltage.

FIG. 4B is a graph depicting the operation of the model of FIG. 4A showing displacement as a function of deflection voltage.

DETAILED DESCRIPTION OF THE PREFERRED EMBODIMENTS

Figure 1:
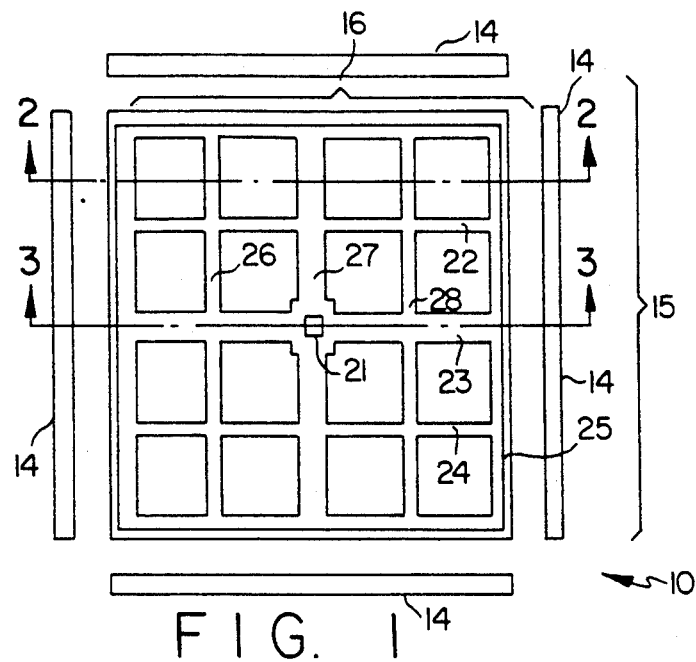
FIG. 1 is a plan view of a single cell of a spatial light modulator constructed in accordance with the present invention, and with the diaphragm removed to show the inner structure of a cell.

The spatial light modulator 10 of the present invention includes a silicon backplate 11 on which is formed a silicon dioxide coating insulator 12. The backplate 11 is bonded to and supported on a strong back 13 for supporting the entire device. A standoff grid 14 of insulating material such as $SiO_2$ is formed on the backplate 11 to define an array of cells, one of which, 15, is shown in detail. Each cell defines a pixel, which may be square, as shown. Within the area of each cell, a deflecting electrode 17 is deposited on the oxide coating 12. A doped silicon diaphragm 18 is bonded to the grid 14 by suitable means such as a bonding interface 19 made of glass. Outwardly facing mirror elements 20 are deposited on the diaphragm 18, one element 20 on each cell to define a reflective pixel therefor, or the entire outwardly facing mirror surface is coated with the reflecting material.

The backplate 11 is made from a p-type silicon wafer through which vent holes 21 are etched at a center position within each cell 15 from both the upper face and the lower face of backplate 11 creating a through hole. A plurality of grooves 22—28 are formed on the upper face of the backplate in each cell so as to intersect each other and to intersect the respective vent hole 21. Each vent hole 21 and the associated grooves 22—28 are constructed of a size to allow gas to escape from within the cell and through the vent hole when the diaphragm element is deflected, and also provides motion damping, which may be set to a critical damping specification, for arresting motion of the diaphragm element after the applied voltage has been changed.

The diaphragm 18 is made of doped silicon so as to be sufficiently conductive to be able to be placed at reference ground potential for operation of the device, a doping level of $10^{18}$ per $cm^3$ being sufficient for the purpose. The movement of the diaphragm is controlled by the electrostatic field developed between it and the cell electrode upon application of the deflection voltage, as will be described.

The diaphragm 18 is etched about the inside border of the grid around each cell 15 to provide a thin wall flexure 30 in the form of a closed curve bounded on the outside by a ridge 32 supported and bonded to the grid 14. The flexure 30 defines a central diaphragm piston area 37 of greater thickness throughout the inside of the flexure which lies in opposition to the cell electrode 17. In operation, selective charging of an electrode 17 with an electric signal attracts the diaphragm piston and causes a deflection of the piston toward the electrode and backplate, the displaced air volume being vented throught the vent hole 21. This avoids pressure sensitivity and also mechanically stabilizes the diaphragm motions after a change in applied signal.

The side of the diaphragm away from the backplate is provided with reflective layer which may be chromium, or other suitable reflecting materials chosen for the wavelength of operation.

A conductor 33 extends from the electrode 17 through the respective vent hole 21 for connection to an electrical sample and hold circuit 36 which may conveniently be connected via a solder bump contact 37 between the strongback 13 and the backplate 11.

The sample and hold circuit 36 is of conventional circuitry, such as used in the monolithic BIFET sample and hold circuit available from National Semiconductor under the designation LF-198 and which is a drivable by an analog logic input XY driver (not shown) having an output from 0 to about 18 volts.

The upper portion of strong back 13 is layer 38. Layer 38 is a silicon integrated circuit containing a suitable circuit 36 for each cell and other circuits (not shown) as necessary for the XY addressable feature.

Silicon strong back 39 is bonded to silicon layer 38 by a bond layer 40. Bond layer 40 may be a glass layer or other suitable layer to join two silicon surfaces together.

Silicon backplate 11 is etched to form contact pads 41. Bonds 42 of glass or other bonding agents bond contact pads to silicon layer 38. The purpose of the contact pads is to accurately maintain the spacing between backplate 11 and layer 38. It is possible that electrical contact can also be made with this mechanical bond, which if accomplished could replace solder bump 37.

The materials used in the construction have been carefully selected for thermal stability of the assembled device. The device is micromachined and assembled using generally known silicon forming and bonding technology. An example of a procedure for making a spatial light modulator in accordance with the present invention will now be given.

The baseplate is formed from a p-type (boron, $10^{16}/cm^3$) 3 to 6 inch diameter silicon wafer 12 to 25 mils thick. First, the wafer is processed to etch the grooves 22-28 and the portion of vent holes 21 etched from the top surface of backplate 11. Then the remainder of vent holes 21 are etched from the bottom surface of backplate 11. Then, a 4 micron silicon oxide layer is grown to form the standoff grid 14 followed by the field oxide layer 12 of about 5000 angstroms (0.5 microns) for electrical isolation between elements.

Afterwards, a high temperature platinum-polysilicon (Pt sintered into polycrystaline silicon to form platinum silicide) conductive electrode layer is defined to establish the conductors 33 and each of the electrodes 17. A layer of bonding glass 19 is selectively laid on the grid 14 for latter use in bonding the diaphragm to the grid. The glass is 7059 (Corning) borosilicate glass to match the thermal properties of silicon.

Alternatively, a simple metal such as aluminum can be used in place of the platinum silicide with a lower temperature bonding glass layer such as Corning 7556.

The diaphragm is manufactured from an p-type (boron, $10^{16}$/cm$^3$) single crystal silicon wafer, 3-6 inches in diameter, on one side of which is epitaxially grown an n-type (arsenic, or phosphorus, $10^{18}$/cm$^3$) silicon layer having a thickness of 3 microns, which forms, with the original wafer, a PN junction which is electrically biased to form an etch stop at the junction interface, for use in a later etch process. The object of using epitaxial growth technique is to allow subsequent removal (by etching) of most of the original wafer and leave only the epitaxially grown layer supported at the peripheral edge by an annular ring of original material. The remaining carefully controlled thickness diaphragm element consists, then, solely of the epitaxially grown n-type layer, 3 microns thick supported in an annular ring.

The flexure pattern is laid out with suitable photolithography and the flexures 30 etched in the epitaxial layer to a depth of 2 microns leaving a 1 micron flexure strip forming a closed curve which will lie about the inside margin of each cell.

The diaphragm is then precisely aligned to the backplate and grid. A small vacuum is drawn through the vent holes to exert a bonding pressure between the diaphragm and the backplate and the assembly is heated to a bonding temperature of 825° C. (for bonding glass 7059) which is sufficient to fuse the glass coating to the grid and diaphragm and to create a fully bonded structure between the diaphragm and the grid.

The chromium layer is sputtered onto the entire outward facing surface of the diaphragm through a shadow mask. If needed for specific features i.e. wavelength reflection efficiency, additional metal such as silver or gold can be coated on the chromium layer. If several modulator arrays are made on a single wafer previously etched v grooves can be used as breaking patterns to separate them.

Referring now to FIG. 4A and 4B a model of the operation of the cell is shown together with the deflection curves. Using a simplified model then, the incremental attractive force on a circular diaphragm, assumed in FIG. 4A, would be $$dF_e = \frac{\epsilon_o V^2 dA}{2 \, d^2(r)} \quad (1)$$

where d is the distance from electrode to the deflecting diaphragm, r is the radial distance from the axis of symmetry, ω is the diaphragm deflection and V is applied voltage. As an approximation, the relative shape of the diaphragm deflection is assumed to be given by equation (2). The relative deflection equation, (2) is appropriate for diaphragm deflected by a pressure difference across the diaphragm where one can relate $\omega_m$ to the pressure difference as given in equation (3). In this calculation we assume that the amplitude and shape of the diaphragm deflection is the same when the total pressure force on the diaphragm is equal to the total electrical attractive force exerted on the diaphragm.

Assuming
$$w(r) = w_m(a^2 - r^2)^2/a^4 \quad (2)$$

where
$$w(r = o) = w_m \quad (3)$$
$$w_m = 0.22 \, qa^4/Eh^3$$

where q is the pressure difference across the diaphragm, E is Youngs modulus and h is the diaphragm thickness.

One can then integrate the incremental force and obtain the total electrical force on the diaphragm, $F_e$.

$$F_e = \int_o^r \frac{\epsilon_o V^2}{2} \frac{2\pi r dr}{(d_o - w_m(a^2 - r^2)^2/a^4)^2} \quad (4)$$

$$F_e = F_o \left[ \frac{1}{2(1 - x) + \frac{1}{4\sqrt{x}}} \ln \left| \frac{1 + \sqrt{x}}{1 - \sqrt{x}} \right| \right] \quad (5)$$

where $$F_o = \frac{\epsilon_o V^2}{2} \frac{\pi a^2}{d_o^2} \text{ and } x = r/a \quad (6)$$

With this one can calculate $\omega_m$ as a function of V by substituting $F_e$ divided by the total diaphragm area for q in Equation (2). The calculated response curve 50 is shown in solid line FIG. 4B while the measured curve 52 is quite close.

Figure 2:
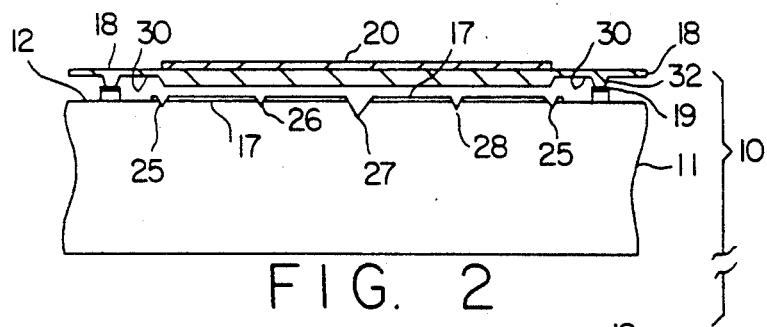
FIG. 2 is a cross-sectional view taken along the lines 2—2 of FIG. 1, with the strong back mounting plate removed.
Figure 3:
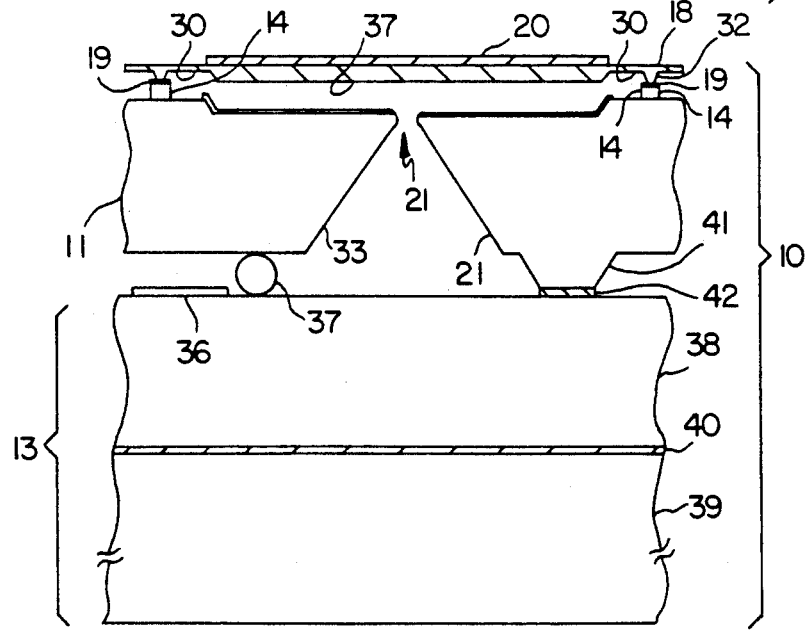
FIG. 3 is a cross-sectional view taken along the lines 3—3 of FIG. 1, as shown with a strong back mounting plate in place.

The completed device is an array of identical cells on a single wafer each of which corresponds to that shown in FIGS. 1-3. The array can be made in various sizes, of which 16×16 and 128×128 arrays being examples. For a device with relatively few cells, e.g. 16×16 cells, it is practical to connect each deflecting electrode to an individual wire bond pad around the periphery of the device. For a device with many elements, e.g. 128×128 cells, it is not practical to have individual pads. The construction appropriate to large arrays shown in FIGS. 1-3 calls for the electrodes to pass through the vent holes to a circuit mounted to the backplate, for convenience. In this way XY addressing. techniques reduce the number of leads and use of the vent holes makes for ready access.

Figure 5:
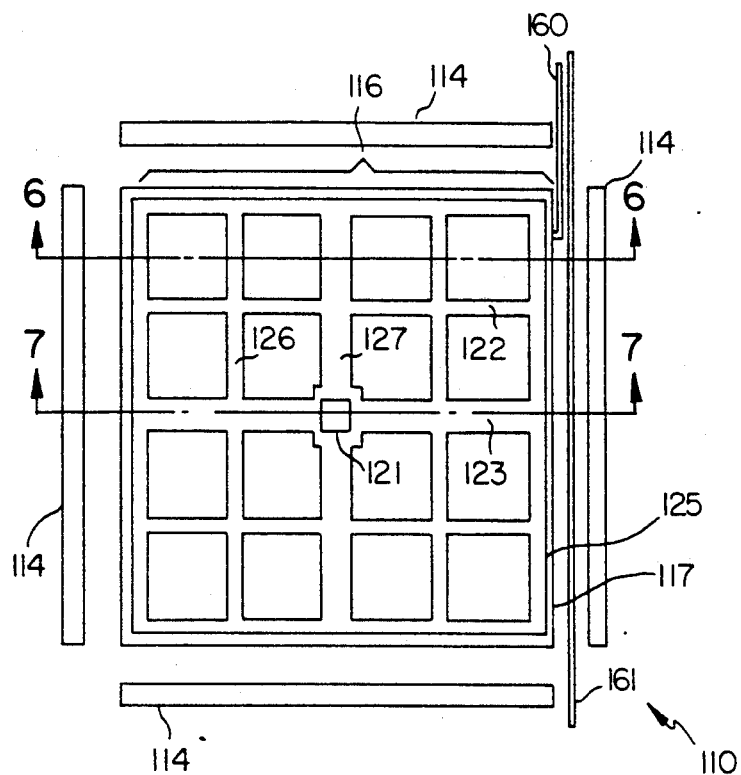
FIG. 5 is a plan view of a cell of an alternative embodiment of a spatial light modulator constructed in accordance with the present invention.
Figure 6:
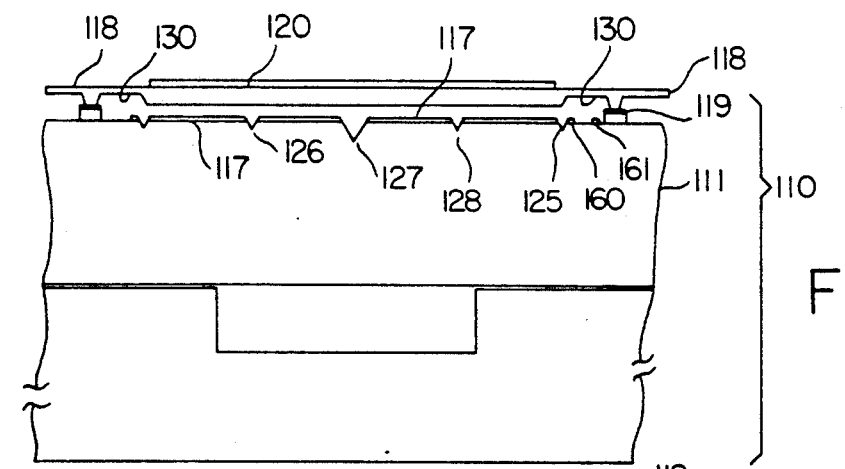
FIG. 6 is a cross-sectional view taken along the lines 6—6 of FIG. 5.
Figure 7:
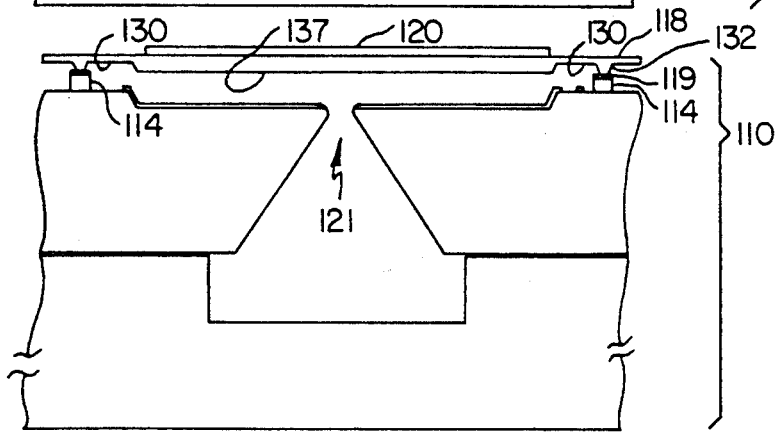
FIG. 7 is a cross-sectional view taken along the lines 7—7 of FIG. 5.

Referring to FIGS. 5-7, an alternative form of the invention is shown in which each cell or pixel is padded out independently. This works well for smaller arrays wherein the number of access leads is limited. In order to minimize repetition, like parts in FIGS. 5-7 have been given the same number as those in FIGS. 1-3 raised by 100. As shown, the electrode 117 is padded out through conductor 160, and other conductors 161 (one being shown) are able to continue through the cell and to pass through the opening made at the grid intersections so as to continue unimpeded through the cell array. As is evident, the number of such conductors 161 increases as the square of the array area so that this approach is limited.

Dimensions and features for a typical 128×128 array include the following:

overall active area: 10 cm × 10 cm (made from 6 inch silicon wafers.)
backplate: silicon p-type (boron) 0.5 mm thick
grid: 4 micron $SiO_2 \times 50$ micron
field oxide layer: 5000 Å $SiO_2$
strongback: silicon layer with XY addressable circuits bonded to a thick piece, ~1 cm thick, of silicon or 7740 glass.
diaphragm thickness after processing: 3 microns
flexure thickness: 1 micron
unit cell: 0.8 mm × 0.8 mm
pixel reflectivity > 0.98
pixel deflection: 0 to 1 micron
area fill factor > 0.6
pixel frequency response: DC to 20 kHz
electrode operating range: 0 to 17 volts
diaphragm sensitivity: $\delta = 0.5$ micron/12 volts
stress for $\delta = 0.5$ micron: 17 MPa.

What is claimed is:

1. A spatial light modulator comprising:
a silicon backplate having an insulating layer therein,
a standoff grid of insulating material deposited on said backplate to define an array of cells covering an area thereof and forming a second layer thereon,
a plurality of electrodes, each electrode being deposited in one of said cells and on said backplate,
a membrane of doped silicon mounted to said standoff grid and over said array of cells and electrodes,
means forming a mirror surface on said membrane on the side facing away from said backplate.

2. The spatial light modulator as in claim 1 further including:
means for selectively charging and discharging each electrode,
whereby each charged electrode causes the individual portions of said membrane overlying each corresponding cell to be deflected by electrostatic attraction between the membrane and the electrode in accordance with a pattern corresponding to the state of the electrical signals placed on said electrodes.

3. The spatial light modulator as in claim 1 further including:
means forming a vent hole in each cell from the electrode side of the backplate to the opposite side thereof for venting gas from said cell when said membrane is deflected.

4. The spatial light modulator as in claim 3 further including:
groove means extending across the face of said backplate and over said cell to intersect said vent hole to assist in venting gas out of said cell and through said hole.

5. The spatial light modulator as in claim 3 wherein said vent hole is of a size and constructed for critical damping of the movement of the mass of said membrane at said cell.

6. The spatial light modulator as in claim 4 wherein said vent hole and said groove are collectively of a size for providing critical damping of the movement of the mass of said membrane.

7. The spatial light modulator as in claim 1 further including:
a plurality of electrical conductors connected to each of said electrodes respectively.

8. The spatial light modulator as in claim 4 further including:
a plurality of electrical conductors connected to each of said electrodes, respectively, through the respective vent hole for each element.

9. The spatial light modulator as in claim 1 wherein said membrane comprises:
a doped thin coating of silicon epitaxially grown on a silicon wafer from which substantially the entire original wafer has been etched away.

10. The spatial light modulator as in claim 1 further in which:
said electrodes are made of platinum silicide.

11. The spatial light modulator as in claim 1 further in which:
said electrodes are made of a layer of an elemental metal or layers of elemental metals.

12. The spatial light modulator as in claim 1 further in which:
said stand off grid is made of silicon dioxide ($SiO_2$) deposited on said silicon backplate.

13. The spatial light modulator as in claim 1 wherein:
said membrane is made about 3 microns in thickness, and
said stand off grid is made about 4 microns in height.

14. The spatial light modulator as in claim 1 further in which:
said backplate and said membrane are made of single crystal silicon material.

15. The spatial light modulator as in claim 1 further including:
a thin oxide layer covering said electrode to prevent sticking of said membrane to said electrode.

16. The spatial light modulator as in claim 1 further in which:
said membrane is provided with means forming flexures of reduced cross-section formed therein along a closed line extending around the inside perimeter of said stand off grid, so that said membrane moves more nearly in piston mode within said flexure means.

17. A spatial light modulator comprising:
a backplate made of doped single crystal high temperature material,
a diaphragm made of doped single crystal material having the same coefficient of thermal expansion as said material of said backplate,
a standoff grid formed on one side of said backplate,
said grid including a plurality of raised ridges formed to project up from one side of the backplate for defining the periphery of a plurality of area elements and for spacing said diaphragm from the backplate,
means bonding said diaphragm on said grid,
a plurality of electrodes disposed on said backplate and within each of said plurality of area elements respectively,
said diaphragm having a thickness small enough to be readily flexed by electrostatic forces applied between said electrodes and said diaphragm,
means in said diaphragm for forming flexures therein around the inside of each said area periphery so that, when flexed, the region of said diaphragm within the flexures preferentially moves in piston mode,
means forming a plurality of vent holes in said backplate with at least one vent hole for each area element, each of said vent holes having a size for critically damping the movement of said diaphragm as caused by said electrode,
electrical connector means for connecting to each of said electrodes through respective vent hole to the opposite side of said backplate.

* * * * *